Dec. 19, 1950 M. ENGLER 2,534,252
TUBE SPLICER
Filed Aug. 12, 1947 2 Sheets-Sheet 1

INVENTOR.
Max Engler
BY
Evans & McCoy
ATTORNEYS

Dec. 19, 1950     M. ENGLER     2,534,252
TUBE SPLICER
Filed Aug. 12, 1947     2 Sheets-Sheet 2
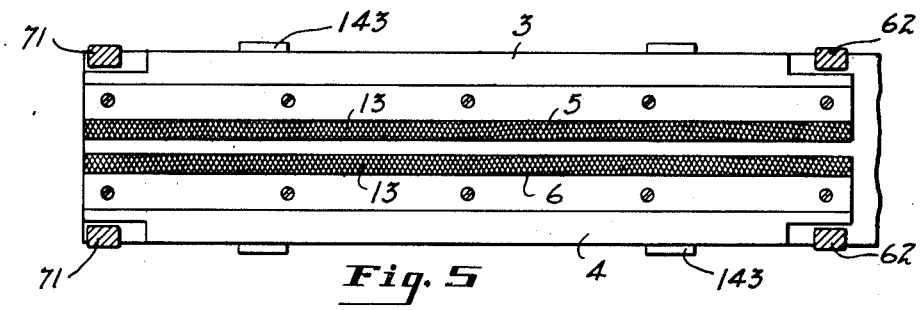
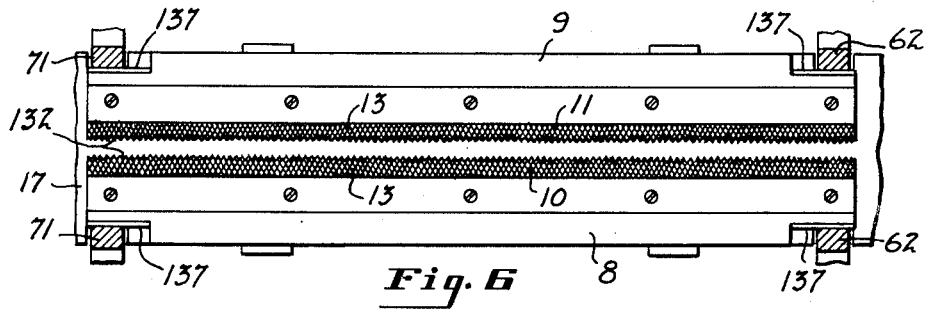
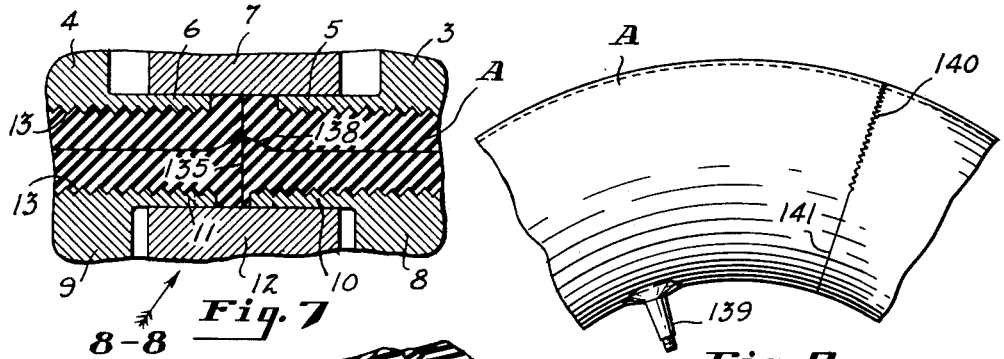
INVENTOR.
Max Engler
BY
Evans + McCoy
ATTORNEYS Patented Dec. 19, 1950

2,534,252

UNITED STATES PATENT OFFICE 2,534,252

TUBE SPLICER

Max Engler, Akron, Ohio, assignor to The General Tire and Rubber Company, Akron, Ohio, a corporation of Ohio Application August 12, 1947, Serial No. 768,215

10 Claims. (Cl. 154—9)

This invention relates to a method of and apparatus for splicing inner tubes of vulcanizable material prior to vulcanization, the method and apparatus being particularly useful for splicing tubes made of so called "synthetic" rubber material such as butyl rubber which is less tacky and more fluent under pressure than natural rubber, although, of course, the invention also is useful in connection with the splicing of all rubber tubes and the like. Reference is made to co-pending application for patent Serial No. 185,640, filed September 19, 1950, for Tube Splicing Method, containing claims to the present method.

Because of the fact that butyl rubber is softer and less adhesive than natural rubber, great difficulty has been experienced in making satisfactory splices between the ends of an automobile tire inner tube prior to vulcanization. Tube splicing machines such as those which have been designed for the splicing of tubes made of natural rubber have not been entirely satisfactory for butyl rubber tubes because they distort the tube at the splice due to excessive flow of the rubber under pressure and in addition many splices prove to be defective because of poor adhesion between the tube ends.

One of the principal objects of the present invention is to provide a method of and an apparatus for splicing the ends of tubular rubber stock in such a manner that the thickness of the tube wall along the splice line is relatively thicker on one side of the tube than the other. Such thickening of the tube wall permits the tubular stock to be bent around a radius when inflated with less likelihood that the spliced ends will separate, the portion of the splice line having thickened wall being disposed on the outside of the curve. This feature of the invention has particularly useful application in the manufacture of vehicle tire inner tubes. The tubular rubber stock is customarily formed by an extrusion process in continuous strip form. This strip is cut into lengths and the individual pieces or lengths are formed into a loop or closed tubes by abutting and stitching together the ends thereof. To cure each of the inner tubes so formed it is inflated in a heated mold, the tube taking the form of a torus in which the outer circumference is stretched more than the inner circumference. In the method of the present invention the portion of the initial pressure splice which is disposed on the outer circumference of the torus is thickened so that the splice has increased strength to resist being parted under the inflation pressure used.

Another object is to provide improved gripping elements for the tube engaging bars of splicers, the elements being capable of effecting an improved interlock with the rubber stock so as to resist slippage or movement of the tube stock relative to the gripping elements.

Another object is to provide a method of and apparatus for splicing tubes by which good adhesion may be obtained between the ends of a butyl rubber inner tube without distortion of the tube at the splice.

A further object of the invention is to provide improvements in splicing machines of the character disclosed in co-pending application for United States patent Serial No. 692,468 filed August 23, 1946.

A still further object of the invention is to provide a generally improved method of and apparatus for splicing tubes which are simple and inexpensive. Other objects and advantages will become apparent from the following detailed description of a preferred embodiment of the invention that has been designed for use on the type of machine disclosed in the co-pending application referred to. Only so much of the apparatus described in that application is shown in the drawings of the present case as is necessary to illustrate the principles of the present invention, it being understood that the parts of the machine not shown may be the same as those of the co-pending case or of other machines of the same type known to the art. Certain features of construction and novel arrangement of parts will become apparent as the description proceeds, the description being made in connection with the accompanying drawings forming a part of this specification.

In the drawings:

Fig. 5 is a plan view of the upper platen partly in section and with parts broken away, this view being taken substantially along the line indicated at 5—5 of Fig. 2;

Fig. 6 is a plan view of the lower platen partly in section and with parts broken away, this view being taken substantially along the line indicated at 6—6 of Fig. 2;

Fig. 7 is an enlarged fragmentary detail in section showing the clamping bars and the serrated flanges thereof in contracted position and interlocked with the rubber stock of a tube being spliced;

Fig. 8 is a diagrammatic, fragmentary perspective view partly in section and with parts broken away illustrating on an enlarged scale the interlocking of the serrated flanges of the clamping bars or elements with the rubber stock or material of the tube being spliced, this view being taken generally in the direction of the arrow shown in Fig. 7; and Fig. 9 is a fragmentary elevational view of the spliced inner tube in inflated condition prior to vulcanization.

In the following description of the method and apparatus of the present invention like parts throughout the several views have been indicated by the same numerals of reference which are also the same as and correspond to the identifying letters and numerals used in the co-pending patent application referred to above with the exception of certain additional numerals applied in the present case in referring to features emphasized herein or not previously shown.

General description of splicing process

Figure 1:
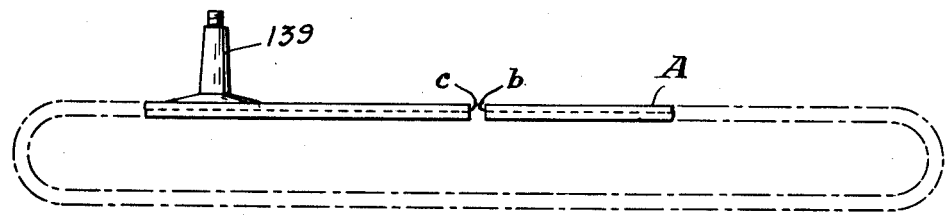
Figure 1 is a side elevation, partly diagrammatic, of a vehicle tire inner tube to be spliced by abutting the ends thereof.

Tube A to be spliced and formed of unvulcanized or raw rubber or the like, has its ends cut in planes at right angles to the length of the tube to provide square, clean ends b and c (Fig. 1) for adhesive contact. The tube is flattened transversely prior to the cutting of the ends b and c. After the cutting operation the ends b and c are placed in contact and the tube ends are pressed in the machine of the present invention between bed and movable platens so as to completely flatten the ends of the tube and bring the abutting edges into full contact throughout the width of the flattened tube.

After the initial pressing operation the tube ends are engaged by a pair of upper gripping bars 3 and 4 which have thin flanges 5 and 6 projecting from their opposing edges and forming part of the gripping faces of the two bars. The flanges 5 and 6, directed toward one another, provide a recess between the bars 3 and 4 in which is mounted a gap closing bar 7 which bridges the gap between the flanges 5 and 6 and lies against the latter. The under sides of the tube ends are engaged by gripping bars 8 and 9 similar to the bars 3 and 4 and which have flanges 10 and 11 corresponding to flanges 5 and 6. A second gap closing bar 12 is mounted in the recess formed by the flanges 10 and 11, underlying the latter, and bridges the space between the edges of the flanges 10 and 11.

The gap closing bars 7 and 12 preferably are made of brass or similar material to reduce frictional resistance with the steel flanges 5, 6, 10 and 11. The tube gripping faces of the flanges 5, 6, 10 and 11 preferably are sharply knurled as shown at 13 (Figs. 5 and 6) to provide more effective gripping of the tube and to thereby prevent slippage of the tube ends.

Figures 3, 4:
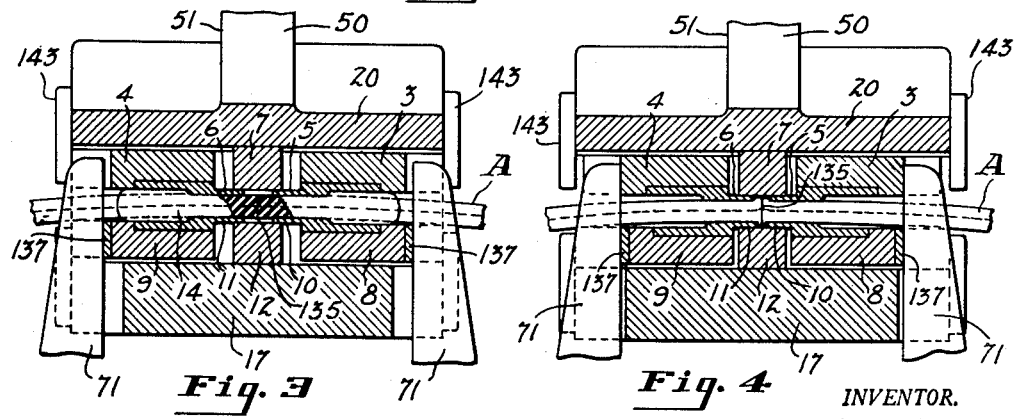
Fig. 3 is a sectional detail taken substantially on the line indicated at 3—3 of Fig. 2 and enlarged with respect to that figure, the clamping bars being shown retracted.
Fig. 4 is a sectional detail corresponding to Fig. 3 showing the clamping bars contracted or advanced.

With the two flattened tube ends firmly gripped between the opposed bars 3 and 8 and 4 and 9 as shown in Fig. 3 of the drawings, gripping pressure is applied as in the process and apparatus of the above referenced co-pending case for a time interval sufficient to permit the knurling 13 to sink somewhat into the faces of the tube to improve the grip on the tube ends after which the two pairs of gripping bars are moved, one pair toward the other and while the gripping pressure is maintained, to apply endwise pressure to the abutting tube ends, as shown in Fig. 4. This movement pushes the gripped portions of the tube toward each other until the tube material at the splice contacts the confining walls. The gap closing bars 7 and 12 are held against the flanges 5 and 6 and 10 and 11 during this movement so that the lateral flow of rubber is confined to the very limited space provided between the edges of the thin flanges.

In order to prevent lateral flow of rubber from the splice at the opposite side edges of the tubes, blocks of sponge rubber 14 are inserted between the tube gripper bars and against opposite side edges of the tube A. These blocks of rubber which bridge the space between the two pairs of grippers when compressed between the gripper bars press inwardly against the opposite side edges of the tube and prevent spreading of the edge portions of the tube due to lateral flow of rubber. If two or more tubes are spliced in the machine at the same time, their side edges are placed together and the rubber blocks 14 are used only on the outer edges of the outer tubes.

With the tube A confined between the gripper bars and the rubber blocks 14, pressure is maintained on the tube ends for a substantial time interval sufficient to cause the tube ends to firmly adhere so that subsequent vulcanization will cause complete joining of the rubber at the splice.

General description of apparatus

The operations above described are conveniently performed in a tube splicing machine of the character disclosed fully in the co-pending application referred to above. Such machine has a flat table or bed 16 which provides support for the inner tubes while they are being spliced. A lower elongated platen 17 is supported cantilever fashion in a fixed horizontal position a short distance above the table 16, the platen 17 being rigidly attached at its inner end to a standard that is a rigid part of the machine frame and that extends above the level of the table 16. A carriage 19 is slidably mounted on the machine frame for vertical movement above the level of the platen 17 and an upper platen 20 is pivoted at its inner end to the carriage 19 to swing vertically. The carriage 19 is spring supported in an elevated or inactive loading position, the platen 20 being supported in a position far enough above the platen 17 to provide convenient clearance for insertion thereunder of a tube to be spliced, or removal of a spliced tube.

The gripping pressure exerted upon a tube being spliced is merely that required to compress a spring which acts on a movable head carrying the upper platen 20. The spring arrangement insures uniformity of pressure during the splicing operation and an elastic connection that accommodates tubes of different thicknesses.

The gap closing bars 7 and 12 are confined between the flanges of the gripper bars and the platens upon which the gripper bars are mounted. Normally the gripper bars are held in their outermost or retracted positions by helical coil springs interposed between the gap closing bars and the gripper bars. Anti-friction bearings, not shown, are interposed between the gripper bars 3 and 4 and the upper platen and also between the gripper bars 8 and 9 and the lower platen. Dovetail ribs 61 on the upper bars 3 and 4 are slidingly received in corresponding under cut grooves formed in the under face of the upper platen 20 to support the gripper bar. Depending stops 143 held by screws to the side faces of the upper platen limit lateral shifting movement of the upper gripper bars; similar stops are also provided on the lower platen 17 to limit movement of the gripper bars 8 and 9.

Serrated gripping flanges and mechanical interlock of rubber

A particular feature of the present invention is the provision on the confronting edges of the thin flanges 10 and 11 of the lower gripper bars 8 and 9 of closely spaced notches 132 which form serrated edges on the flanges. These notches are preferably of substantially V shape having narrow bottoms 133 and relatively sharp points 134. As pressure applied by the upper platen 20 to the gripper bars 3 and 4 compresses the end portions of the tubular rubber stock between the flanges 6 and 11 of the gripper bars 4 and 9 on one hand and the flanges 5 and 10 of the gripper bars 3 and 8 on the other hand, the rubber material is forced into the spaces or pockets formed by the notches 132 and the adjacent portions of the face of the lower gap closing bar 12. During the dwell period of the machine while the clamping bar pressure is maintained on the rubber stock of the tube being spliced the rubber material flows into the closely spaced pockets formed by the serrated edges of the gripper bar flanges 10 and 11 becoming intimately interlocked therewith. This interlocking connection between the rubber stock and the gripper bar flanges strongly resists relative movement of the rubber on the gripper bars during the subsequent compacting together of the abutted tube ends along splice line 135 formed by the abutted ends b and c.

Figure 2:
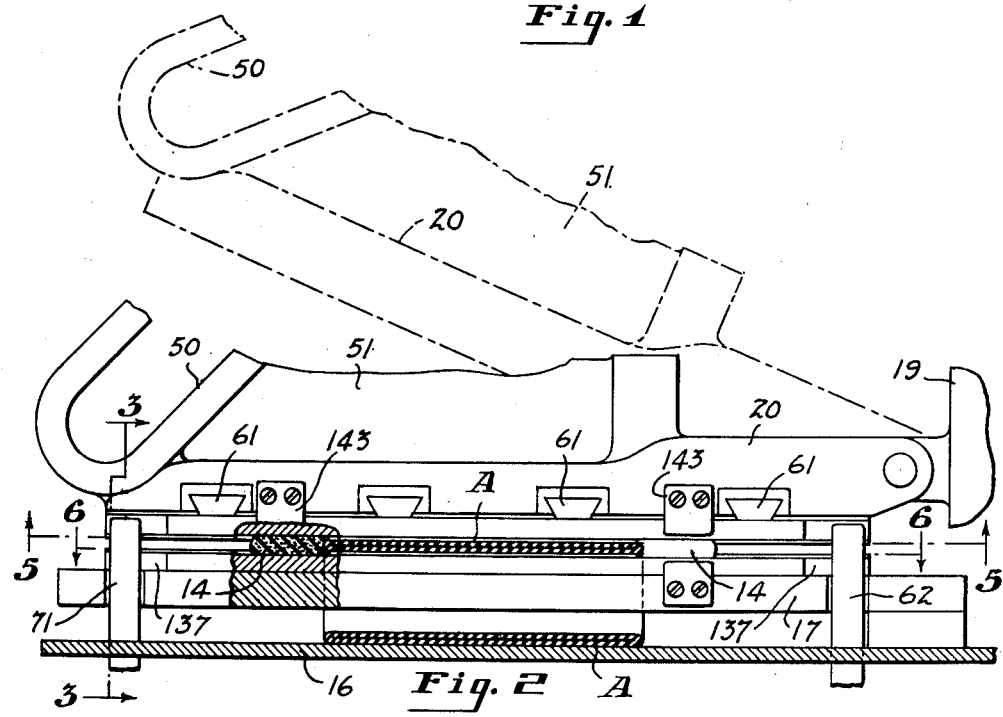
Fig. 2 is a transverse sectional view through the tube supporting table of the splicing apparatus or machine showing the tube clamping platens in side elevation, parts being in section and parts being broken away and removed.

When the machine is idle, as between splicing operations on successive tubes, the upper platen 20 is normally in the raised position indicated by the broken line of Fig. 2, the outer end of the lower platen 17 being free to receive a tube to be spliced. The abutted ends b and c of a tube to be spliced are then disposed so that they rest upon the top face of the lower platen with the body of the tube supported upon the table 16. The splice line is centered or disposed to lie along the lower gap closing bar 12. The machine is then operated as described in the above identified co-pending application to close the platens so that the tube is gripped therebetween. The machine is allowed to dwell with the abutted tube ends clamped between the platen for a substantial period of time sufficiently long for the gripping bar flanges to sink into the rubber material and for the tube stock to flow into the small cups or chambers formed by the serrations 132.

After the initial dwell period with the platens closed the tube gripping bars are contracted or moved toward the center of gap spanning bars 7 and 12 to apply endwise pressure to the abutting faces b and c of the tube ends. This action is by means of an actuating mechanism mounted in the frame of the machine and including a pair of rear actuating arms 62 and a pair of front actuating arms 71. The arms 62 are mounted at their lower ends on fixed horizontal pivots and are supported in substantially upright position on opposite sides of the platen 17 and extend upwardly through the table 16.

The front actuating arms 71, similar to the arms 62, are pivoted at their lower ends to a vertically movable slide and are movable from a position entirely below the surface of the table 16 to a position straddling the outer end of the platens 17 and 20 for engagement with the gripper bars carried by the platens. The arms 71 are first elevated to operative position with respect to the gripper bars, and are then actuated simultaneously with the actuation of the arms 62 to apply pressure to the gripper bars of both platens.

Differential gripper bar movement

Between each of the bottom gripper bars 8 and 9 and the actuating arms 62 and 71 are disposed spacers or shims 137 which are engaged by the actuating arms prior to contact between such arms and the upper gripper bars 3 and 4. Accordingly the contracting movement or shifting together of the bottom gripper bars is initiated slightly ahead of or prior to the moving together of the upper gripper bars 3 and 4. In the present instance the shims 137 are secured by screws on the side faces by the bottom gripper bars 8 and 9. They may, however, be mounted on the actuating arms 62 and 71. Furthermore, instead of using shims, a similar initial shifting movement of one set of the gripper bars can be produced by making such pair of gripper arms wider than the other, by forming recesses in the side faces of one set of the gripper bars to receive the actuating arms, or by forming protruding bosses on the gripper bars or actuating arms. The effect of the initial movement of one set of gripper bars ahead of the other is to move them over a longer path than the path over which the other set of gripper bars is shifted.

By reason of moving one pair of the gripper bars over a longer path than the other a greater movement is imparted to the rubber stock adjacent and along the splice line on one side of the rubber tube than on the other side of the tube. As shown in Fig. 7 the movement of the bottom gripper bars 8 and 9 over a longer path than that of the gripper bars 3 and 4 produces a localized swelling of the bottom half of the abutted tube sections as indicated at 138. Thus the tube side walls contacted by the faces of the bottom gripper bars 8 and 9 are increased in thickness along and adjacent the splice line 135, there being a corresponding decrease in thickness and section of the tube side wall contacting the upper gripper bars 3 and 4.

The splicing machine is held motionless, with the gripper bars in contracted or closed positions, for a sufficiently long period of time to allow the abutting faces b and c of the tube ends to become firmly adhered or "stitched" together along the splice line 135. Thereafter the tube is withdrawn from between the platens 17 and 20 and inflated through valve 139. Prior to complete inflation the tube is reversed from the position of Fig. 1 so that the valve 139 is disposed on the inside of the torus as is conventional with vehicle tire inner tubes. This reversal of the inner tube places the thickened portion of the splice formed by the serrated flanges 10 and 11 on the outer periphery of the inflated tube, this portion of the splice being indicated at 140 (Fig. 8). It is this portion of the splice, disposed across the outer circumference of the inflated annular tube, which is more highly stressed and subject to strains which tend to separate the edges of the splice. It is therefore extremely advantageous to have that portion of the splice which is across the outer circumference of the inflated annulus of increased thickness, as provided by the method and apparatus of the present invention.

The relative decrease in thickness of the tube wall across the inner circumference of the inflated annular tube, this portion of the splice being indicated at 141, is not seriously objectionable since only relatively small forces are present along the inner circumference of the inflated tube tending to separate the tube ends along the splice line.

Although the present machine provides for a relative increase in thickness along the splice line of one of the tube walls relative to the other by starting the contracting movement of one pair of gripper bars prior to the movement of the other pair of gripper bars a similar result is obtained by simultaneously initiating the movement of both pairs after the other pair of gripper bars has stopped, or by moving one pair faster or at a greater rate of speed than the other.

It is furthermore apparent that it is a thickening of one wall of the tube along the splice line relative to the thickness of the other wall of the tube that is provided by the present invention. Both walls of the tube may, of course, be thickened along the splice line relative to the normal thickness of the tube walls by increasing the thickness of the tube contacting flanges 5, 6, 10, and 11 or by altering the contour of the rubber contacting faces of such flanges.

The principles of the present invention may be utilized in various ways, numerous modifications and alterations being contemplated, substitution of parts and changes in construction being resorted to as desired, it being understood that the apparatus shown in the drawings and described above and the particular method set forth are given merely for purposes of explanation and illustration without intending to limit the scope of the claims to the specific details disclosed.

What I claim is:

1. In a tube splicer having elongated platens mounted for movement toward and away from one another, pairs of tube gripping bars mounted on opposed faces of the platens, the bars of each pair extending longitudinally of the platens and movable transversely thereof, the adjacent edges of the bars of each pair having aligned thin flanges directed toward one another and formed with tube engaging faces, the flanges of the bars on one platen having serrated edges forming two series of relatively sharp points directed toward one another, a gap covering member disposed between the flanges of each pair of bars and the platen on which the bars are mounted, and means for moving said bars toward one another, the serrations along the edges of the bars and the gap covering member forming two continuous series of confronting relatively small side by side pockets along the edges of the tube gripping bars to receive the material of the tube being spliced so as to provide an interlocking grip therewith during the splicing operation.

2. A tube splicer comprising platens mounted for movement toward and away from one another, pairs of tube gripping bars mounted on opposed faces of the platens, the bars of each pair extending longitudinally of the platens and movable transversely thereof, the adjacent edges of the bars of each pair having aligned thin flanges directed toward one another and having tube engaging faces, a gap covering member disposed between the flanges of each pair of bars and the platen on which the bars are mounted, spring means for spreading the gripping bars, pivoted actuating arms movable to bear against the gripping bars to move the latter toward one another and means interposed between the actuating arms and some of the gripping bars to provide relatively greater movement of some of the gripping bars than others of the gripping bars.

3. A tube splicer comprising platens mounted for movement toward and away from one another for clamping a tube therebetween, a pair of tube gripping bars mounted on one of the platens for movement toward and away from one another, said bars having aligned thin flanges directed toward one another, a gap covering member disposed against the flanges of the bars, and serrations along the edges of the flanges providing opposed pockets directed toward one another and lying along the gap covering member, and means for moving the bars toward and away from one another.

4. A tube splicer comprising a supporting structure and platens mounted thereon for movement toward and away from one another, a pair of tube gripping bars mounted on each platen, the bars of each pair being movable toward and away from one another and having tube contacting surfaces, the adjacent edges of one pair of bars being formed with thin flanges terminating in closely spaced serrations, a gap covering member disposed against the serrated flanges to provide along each of the bars a series of pockets for receiving material of the tube being spliced, means for holding the platens in clamping relation on a tube and means for moving the tube gripping bars of each pair toward one another, including means for moving the tube gripping bars having the serrated flanges a relatively greater distance than the other tube gripping bars.

5. In a tube splicer comprising platens at least one of which is mounted for movement toward and away from the other, tube gripping bars mounted on at least one of the platens and having tube contacting faces for engaging the surfaces of tube ends abutted along a splice line, means for moving the gripping bars toward one another to compress the stock of a rubber tube disposed between the platens so that the rubber material of abutted tubes is crowded together along the splice line, the gripper bars having thin flanges directed toward one another and formed as continuations of the tube engaging surfaces of the bars, and a gap covering member disposed against said flanges and serving to confine the rubber stock of a tube being spliced against lateral flow under pressure between the tube gripping bars, the improvement which comprises a series of closely spaced serrations along the edge of each of the flanges, whereby said flanges and the gap spacing member provide a series of side by side relatively small pockets along the tube gripping bars to receive compressed tube material and to form an interlock therewith to resist slippage of the tube material relative to the serrated flanges during the movement together of the gripper bars in a splicing operation.

6. A tube splicer comprising platens and means mounting the same for movement toward and away from one another, a pair of tube gripping bars mounted on the face of each platen and movable toward and away from one another, the bars of each pair having relatively thin flanges directed toward one another, gap covering bars disposed between the bar flanges and their respective platens and means for moving the tube gripping bars toward one another and including means for effecting a greater relative movement of one pair of bars than of the other.

7. In a machine for splicing rubber tubes while holding them flat and having pairs of gripper bars movable toward and away from one another for frictionally engaging the rubber stock of a tube along opposite sides of the splicing line of abutted tube ends, the improvement which comprises the combination of a multiplicity of closely spaced serrations formed along the opposed edges of thin flanges formed on one pair of the gripper bars and a gap spacing bar disposed against the serrated flanges whereby a series of relatively small side by side pockets are provided along the edges of the serrated gripper bars to receive and interlock with portions of the rubber material of a tube being spliced to prevent slippage of the tube material relative to the gripper bars.

8. In a tube splicer having platens and means mounting the same for movement toward and away from one another to clamp therebetween the splice line forming abutted ends of flattened tubular stock, tube gripping bars mounted in pairs on the opposed faces of the platens, the bars of each pair having tube contacting faces and being movable toward and away from one another, and having means for moving the tube gripping bars toward one another to compact together the abutted tube stock ends along the splice line, the improvement which comprises shim means associated with one or more of the tube gripping bars and interposed between the same and the actuating means for effecting an initial movement of such tube gripping bar in advance of the other whereby to move the rubber stock engaged by such gripper bar a greater amount than the rubber stock engaged by the other gripper bars.

9. In a machine for splicing rubber tubes of the type having platens mounted for movement toward and away from one another, each platen carrying a pair of tube gripping bars having thin flanges directed toward one another and gap covering bars disposed against the flanges of each pair of tube gripping bars, and having means for moving the tube gripping bars of each pair toward one another for compacting the rubber material along the splice line of abutted tube ends, the improvement which comprises shim means interposed between the actuating means and one or more of the tube gripping bars to provide an increased movement of said one or more bars with respect to the other tube gripping bars of the machine.

10. In a tube splicer comprising platens at least one of which is mounted for movement toward and away from the other, tube gripping bars mounted on at least one of the platens and having tube contacting faces for engaging the surfaces of tube ends abutted along a splice line, means for moving the gripping bars toward one another to compress the stock of a rubber tube disposed between the platens so that the rubber material of abutted tubes is crowded together along the splice line, the gripper bars having thin flanges directed toward one another and formed as continuations of the tube engaging surfaces of the bars, and a gap covering member disposed against said flanges and serving to confine the rubber stock of a tube being spliced against lateral flow under pressure between the tube gripping bars, the improvement which comprises a series of closely spaced serrations along the edge of each of the flanges, whereby the rubber material is forced into the spaces intermediate the notches of the serrations and the face of the gap covering member to form an interlock with the tube gripping bars and to resist slippage of the tube material relative to the serrated flanges during the movement together of the gripper bars in a splicing operation.

MAX ENGLER.

REFERENCES CITED

The following references are of record in the file of this patent:

UNITED STATES PATENTS

| Number | Name | Date |
| --- | --- | --- |
| 1,188,694 | Stanford | June 27, 1916 |
| 1,190,744 | Fenton | July 11, 1916 |
| 1,310,436 | Roberts | July 22, 1919 |
| 1,311,392 | Harrison | July 29, 1919 |
| 1,628,203 | Stein | May 10, 1927 |
| 2,035,682 | Wikle | Mar. 31, 1936 |
| 2,186,286 | Engler et al. | Jan. 9, 1940 |
| 2,254,596 | Breth et al. | Sept. 2, 1941 |